3,309,351
PHOTODEHYDROGENATION OF RESIN ACIDS

Walter H. Schuller and Ray V. Lawrence, Lake City, Fla., assignors to the United States of America as represented by the Secretary of Agriculture
No Drawing. Filed Apr. 2, 1964, Ser. No. 356,985
8 Claims. (Cl. 260—98)

A nonexclusive, irrevocable, royalty-free license in the invention herein described, throughout the world for all purposes of the United States Government, with the power to grant sublicenses for such purposes, is hereby granted to the Government of the United States of America.

This invention relates to a method using pine gum resin acids for producing dehydrogenated resin products particularly suitable for a variety of commercial uses, and to the novel products so produced. More specifically, it deals with a method for dehydrogenating resin acids by irradiating with visible light solutions comprising the resin acid and an oxidation-type photosensitizer. The dehydrogenated resin acid products resulting from the process of our invention are characterized by excellent stability to air-oxidation.

The term "resin acids" generally includes the seven major resin acids in pine gum but, as will be discussed below, is more specifically directed to the levopimaric, palustric, and neoabietic acids. Photodehydrogenation of the levopimaric and palustric acids produces dehydroabietic acid. Photodehydrogenation of neoabietic acid produces conjugated trienes.

The term "sensitizer" includes erythrosin (which is the sodium salt of tetraiodofluorescein), 9,10-phenanthrenequinone, benzil, chloranil (in benzene solution), eosin (which is the sodium salt of tetrabromofluorescein), sulfur, 9,10-anthraquinone, etc.

The term "hydrogen acceptor" as used below includes substances such as nitromethane, benzil, elemental sulfur (referred to below as sulfur flowers) and the like.

As noted above, dehydroabietic acid is stable to air oxidation in contrast to other of the resin acids, such as abietic acid. Accordingly, it is very useful in the manufacture of butadiene-styrene rubber where it functions as a stable emulsifying agent. However, dehydroabietic acid is difficult to prepare in the pure state by prior art methods and low yields of the order of about 25% have been obtained from gum rosin. The most frequently used method prior to our invention involves many steps including catalytic disproportionation by heating to high temperatures, sulfonation, repeated recrystallization to separate the sulfonic acid, and finally, the removal of the sulfonic acid group.

A second method, even less attractive, involves disproportionation, methylation separation of the methyl ester by repeated recrystallization and a difficult, high-temperature, lengthy hydrolysis of the stable tertiary ester. Thus it is seen that there is a real need in the pine-gum resin field for an effective method of dehydrogenating resin acids to form dehydroabietic acid.

We have now found that resin acids may be reduced in a remarkably efficient and simple manner by the irradiation with visible light of a solution of the resin acid in the presence of a sensitizer.

In general, the process of our invention may be described as follows:

(1) Prepare a solution of the resin acid at about ambient room temperature;
(2) Add to the resin acid solution a predetermined quantity of the sensitizer, as will be discussed more fully below in the examples;
(3) Transfer the resin acid solution containing the resin acid and sensitizer (or sensitizer and hydrogen acceptor when the latter is used) to the reactor;
(4) Purge the system of oxygen;
(5) Contact the oxygen-free (O-free) resin acid sensitizer solution with light having a suitable wave length;
(6) Continue the photodehydrogenation until the specific rotation becomes constant;
(7) Recover the reduced resin acid in dry form, generally by extracting with a suitable solvent and drying.

The process is simple and easily applied. The sensitizer may be present in "substantial" or "catalytic" amounts, as will be described more fully below. The temperature of the reaction likewise may be varied over wide limits although ambient room temperatures cause satisfactory results to be obtained.

Preparation of the solution of resin acid

The resin acid is dissolved in a suitable, commercially available solvent such as ethanol, methanol, benzene, alcohol-aqueous alkali, aqueous alkali, carbon disulfide-alcohol, etc. The specific requirement is that the solvent used is a mutual solvent for the resin acid, the sensitizer, and the hydrogen acceptor when the latter is used. Because of its availability, 95% ethanol-5% water (hereafter designated 95% ethanol) is frequently used. The sensitizer is then added.

The concentration of resin acid in the solution may range from about 1–20 weight percent resin acid. A range of about 2–10 weight percent is preferred.

As noted above, the sensitizer can be, in general, any of those compounds which are active as sensitizers in photosensitized oxidations (cf. Walter H. Schuller and Ray V. Lawrence, J. Am. Chem. Soc., 83, 2563 (1961); Walter H. Schuller, Richard N. Moore, and Ray V. Lawrence, J. Am. Chem. Soc., 82, 1734 (1960)). That these oxidation-type sensitizers would also function in dehydrogenation was unexpected. The characteristic feature of active sensitizers is the presence of an ortho-quinoid grouping in which the terminal atoms of such a system are heteroatoms such as oxygen, sulfur, halogen, and nitrogen. Some of the better sensitizers for carrying out photodehydrogenations are erythrosin, 9,10-phenanthrenequinone, benzil, chloranil, eosin, and 9,10-anthraquinone. When these sensitizers are used in molar amounts with the resin acids, a disproportionation occurs upon irradiation, with the resin acid undergoing a dehydrogenation and the sensitizer adding hydrogen.

The term "substantial amounts" of sensitizer refers to molar ratios of sensitizer to resin acid of from about 1:2 to 2:1. The use of less than a ratio of 1:2 moles (sensitizer:resin acids) often results in incomplete reactions as is demonstated by a bleaching of the solution before the reaction is completed, as will be discussed more fully below in Example 2.

It is within the scope of our invention to reduce the quantity of sensitizer to a "catalytic" amount by incorporating a "substantial" quantity of some commercially available compound which can act as a hydrogen "acceptor." Examples of hydrogen acceptors are: nitromethane, benzil, elemental sulfur (sulfur flowers), etc. The resin acid again undergoes dehydrogenation and the hydrogen acceptor is also reduced.

The term "catalytic amount" means in the range of about 0.005–0.025 mole of sensitizer to one mole resin acid.

The term "substantial amount" of hydrogen acceptor means in the range of about 1 to 20 moles hydrogen acceptor to one mole resin acid.

Transfer of solution to reactors

The solution of resin acid, sensitizer and hydrogen acceptor, when used, is then transferred to a suitable reactor. Suitable reactors may be constructed from materials capable of transmitting "light" of the wave length absorbed to the greatest extent by the sensitizer employed. In the examples below, glass has been used for the reactor. However, we are not limiting our invention to the use of glass reactors. The reactor is preferably equipped with a reflux condenser and should be capable of being stoppered or closed by any suitable conventional means.

Purging the system of oxygen

After the reactor is charged with the resin acid solution containing the sensitizer, or sensitizer and hydrogen acceptor, the system is purged of oxygen using prepurified nitrogen. The reactor is then stoppered.

Irradiation of resin acids

The reactor and its contents are then exposed to irradiation which causes the resin acid to be dehydrogenated while simultaneously reducing the sensitizer and the hydrogen acceptor, when present. Visible light such as that obtained from fluorescent lamps or iridescent lamps is suitable. Other light sources having a spectral emissivity capable of being absorbed by the sensitizer may be used. The regulating factor is to employ a light source which supplies in high intensity light of the wavelengths absorbed to the greatest extent by the sensitizer employed.

As noted above the sensitizers which may be used in our invention are those previously used in photosensitized *oxidations* and it was unexpected that these same sensitizers could be used in the photodehydrogenation of resin acids.

Irradiation and dehydrogenation of the resin acids are continued until there is no observable rate of change in optical activity, $[\alpha]_D$. In other words, the reaction is complete when $[\alpha]_D$ reaches a constant value.

Recovering the dehydrogenated resin acid

When the photodehydrogenation of the resin acid is completed, the solvent is removed, preferably under reduced pressure, and the dry residue purified by conventional means. The thus-purified material is then confirmed by comparison with an authentic sample of the particular resin acid.

The subject reaction of photodehydrogenation with the use of substantial amounts of sensitizer, when applied to levopimaric acid, yields dehydroabietic acid

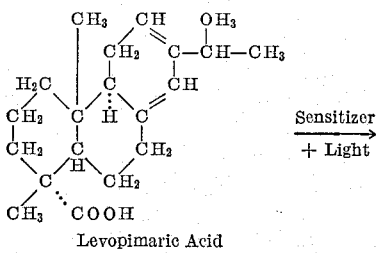

Levopimaric Acid

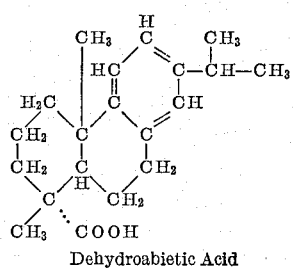

Dehydroabietic Acid due to the loss of 2 hydrogen atoms. The same product is obtained when palustric acid is subjected to a similar photodehydrogenation.

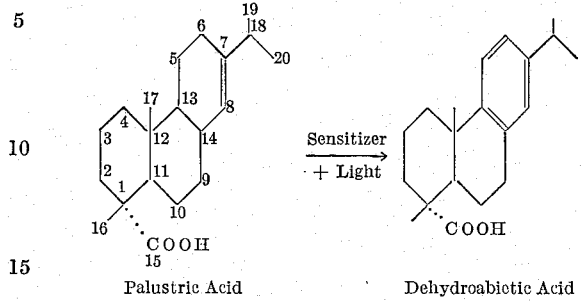

Palustric Acid          Dehydroabietic Acid

On the other hand levopimaric acid in the presence of a catalytic amount of sensitizer and substantial amounts of the hydrogen-acceptor nitromethane gives dehydroabietic acid. When sulfur is used as a hydrogen acceptor a product containing sulfur is obtained. Sulfur acting as both sensitizer (no dye present) and hydrogen acceptor gives, under similar conditions, dehydroabietic acid and a product containing sulfur. The novel resin acid products containing sulfur are useful as lubricating-oil additives, paper sizes, and as surface-active agents, especially as dispersing agents and are an embodiment of our invention.

Levopimaric acid plus a molar amount of benzil ($C_5H_6$—CO—CO—$C_6H_5$) on irradiation in the presence of a catalytic amount of the sensitizer erythrosin gives dehydroabietic acid, benzoin, and/or hydrobenzoin. When this hydrogen acceptor is used the sensitizer may be omitted since a similar reaction occurs in the absence of the added sensitizer and this forms a still further embodiment of our invention.

Reduction of the diketon chloranil

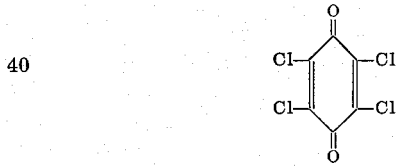

to tetrachlorohydroquinone is accomplished by irradiation of a solution of levopimaric acid and the diketon. Various other diketones are similarly reduced, e.g., 9,10-phenathrenequinone and 9,10-anthraquinone. It is thus seen by the instant process, i.e., irradiation of a resin acid together with a solution of a reducible compound such as diketones, nitro-alkanes, etc., that a reduction of the reducible compound is effected.

The use of only a catalytic amount of sensitizer plus a hydrogen acceptor is believed to be an entirely new type of reaction and also is an embodiment of our invention. The incorporation of sulfur into the levopimaric acid molecule (in the presence or absence of a sensitizer) is likewise believed to be an entirely new reaction and the resultant products are believed to be new. Dehydrogenation is clearly shown to be occurring in the reactions with sulfur as evidenced by the evolution of hydrogen sulfide during irradiation. As noted above, these novel resin acid products containing sulfur have many commercial uses such as lubricating oil additives, paper sizes, and as surface-active agents. The reduction of diketone, e.g., chloranil and benzil to the corresponding hydroxy compounds under the very mild conditions of irradiation with visible light at room temperature is an extremely useful reaction in, for example, the pharmaceutical field, where mild reducing conditions are required.

Certain resin acids when hydrogenated yield more than one product; for example, under similar reducing conditions (i.e., the use of substantial amounts of sensitizer) neoabietic acid yields several products under similar conditions, two of which are new conjugated trienes, formed as a result of dehydrogenation or loss of hydrogen atoms. These trienes are useful as new vinyl-type comonomers.

The following examples will further illustrate the embodiments of our invention and are given for illustrative purposes only. Temperatures are given in degrees centigrade. UV measurements are made with a Beckman DU spectrophotometer. IR measurements are made with a Perkin-Elmer Model 21 spectrophotometer.

In the following group of examples, substantial quantities of an oxidation-type sensitizer are employed.

Melting point (M.P.) is determined by means of a Thomas Hoover Melting Point Apparatus; $[\alpha]_D^{25}$ via standard equipment; infrared $\lambda_{max}$ (Nujol Mull) via Perkin-Elmer Model 21 infrared spectrophotometer; n.m.r. by means of a varian A-60 spectrophotometer.

EXAMPLE I

A solvent consisting of 95% ethanoll and 5% water (hereafter referred to as 95% ethanol) was used in the preparation of a 0.02 M levopimaric (resin) acid solution.

Equal portions of this solution were then entered into each of four 100-ml. reactors, after which portions of erythrosin B were added in the following amounts:

Reactor #1—1 mole erythrosin B to 2 moles resin acid
Reactor #2—1 mole erythrosin B to 4 moles resin acid
Reactor #3—1 mole erythrosin B to 6 moles resin acid
Reactor #4—1 mole erythrosin B to 8 moles resin acid These reactors consisted of test tubes each 2.85 cm. in outside diameter and 26 cm. in length. Each tube was fitted with a reflux condenser and a sintered glass, pencil-type, gas-inlet tube extending almost to the bottom of the tube. The tubes were mounted vertically in a plane and irradiated by a 15-watt, daylight-fluorescent tube with reflector which was mounted horizontally in front of the centers of the tubes. The solutions were then purged with prepurified nitrogen, stoppered, and irradiated simultaneously. All the runs but the 1:2 ratio were bleached within 22 hours while the 1:2 ratio remained unbleached after 111 hours of irradiation.

Another run of the 1:2 ratio (reactor No. 1) was made and irradiation continued until no further change in the optical activity, $[\alpha]_D$, occurred. Moore erythrosin was then added to give a molar ratio of 1.5 moles erythrosin to 2 moles levopimaric acid and irradiation continued for 21 hours. No further change in $[\alpha]_D$ was observed.

EXAMPLE 2

A solution containing 11.9 g. erythrosin in 2700 ml. of 95% ethanol was filtered and 8.17 g. levopimaric acid was dissolved in the filtrate (0.005 M dye and 0.01 M resin acid). The solution was then charged to a reactor consisting of two Pyrex tubes mounted vertically, one inside the other. The outer tube (7.5 cm. inside diameter and 125 cm. in length) was fitted at its lower end with a sintered glass plate for gas input. The inner tube (4.5 cm. outside diameter and 130 cm. long), open only at its upper end, contained a 40-watt fluorescent tube (Sylvania daylight). The reaction solution was charged into the outer tube so as to be illuminated from within. The solution was then purged with prepurified nitrogen, the reactor sealed (stoppered), and irradiation initiated. Two external air blasts were directed on the reactor to hold the temperature around 30° C. After 20 hours of irradiation, the specific rotation became constant at $[\alpha]_D^{27}$ —30°. Irradiation was continued for 10 hours more to insure completeness of reaction. The solvent was removed under reduced pressure and the dry residue extracted with ether. The ether solution was filtered, washed with water and the ether stripped. The residue (8.0 g.) exhibited no absorption maximum in the 272 mu region. The residue was converted to a cyclohexylamine salt in acetone solution. The yield was about 3.59 g. (33%). The mother liquor was concentrated and gave a black viscous oil. The free acid was liberated from the salt using an aqueous phosphoric acid-ether mixture, containing about 100 ml. of ether and one molar equivalent of phosphoric acid based on the amine salt, in about 100 ml. of water. The crude acid was placed on a silicic acid (100 mesh) column 1.25 inches in diameter containing 68 g. of adsorbent and eluted with 1200 ml. of benzene. The effluent was collected in 75 ml. aliquots and the solvent blown off with nitrogen. The residue from fractions 3-9 were combined and crystallized from 95% ethanol to give 0.98 g. of dehydroabietic acid; $[\alpha]_D^{25}$ +62.7° (c. 1.1 in 95% ethanol);

$\lambda_{max}^{alc.}$ 276 mu ($\alpha$ 2.19), 268 mu ($\alpha$ 2.12); M.P. 169–171° the infrared spectrum was essentially identical to that of an authentic sample. Two further crops of 0.48 g. $[\alpha]_D^{26}$ +60° (c. 1.0 in 95% ethanol) and 0.14 g. were obtained for a total of 1.60 g. or about 20% conversion from levopimaric acid.

EXAMPLE 3

A solution of 21.6 g. of erythrosin and 7.42 g. of palustric acid in 2450 ml. of 95% ethanol (0.01 M in dye and 0.01 M in resin acid) was charged to the reactor described in Example 2 and irradiated for 40 hours. The reaction mixture was worked up as described in Example 2; the yield of crude residue was 6.5 g. A small portion was then esterified with diazomethane; $[\alpha]_D$+38° (c. 0.56 in 95% ethanol) and no absorption maximum was exhibited in the 266 mu region. The ester was gas chromatographed and a single, large peak was obtained at the same emergence time as a sample of an authentic methyl dehydroabietate. The remainder of the residue was converted to 5.28 g. (61%) of cyclohexyl-amine salt. Upon concentration the mother liquor produced a black-red oil. The acid was then regenerated from the salt and the crude product cleaned up on a silicic acid column as before, employing benzene as the eluent. The purified product was crystallized from 95% ethanol to give 1.29 g. of dehydroabietic acid; M.P. 171–173°; $[\alpha]_D^{26}$+62.8° (c. 1.1 in 95% ethanol)

$\lambda_{max}^{alc.}$ 276 mu ($\alpha$ 2.23) 268 mu ($\alpha$ 2.18)

and an infrared spectrum essentially identical to that of an authentic sample. A second crop weighing 0.26 g. was obtained of $[\alpha]_D^{26}$+64.2° (c. 1.0 in 95% ethanol) for a total yield of 21% from the starting palustric acid.

EXAMPLE 4

A solution of 23.8 g. of erythrosin and 8.17 g. of neoabietic acid in 2700 ml. of 95% ethanol (0.01 M in dye and 0.01 M in resin acid) was irradiated for 42.5 hr. and worked up as in Example 2 above. A portion of the residue $[\alpha]_D^{28}$—22° (c. 1.2 in 95% ethanol) was esterified with diazomethane and gas chromatographed at 250° C. on a GE SE-52 silicone column. Four peaks were obtained:

Peak 1, no absorption from 220–320 mu; peak 2 (second largest peak), $\lambda_{max}^{alc.}$ 243 mu; peak 3 (major peak) $\lambda_{max}^{alc.}$ 264,274 (major max) 284 mu; peak 4, $\lambda_{max}^{alc.}$ 264,274 (major max) 285 mu.

(Methyl abietate emerges between peaks 1 and 2.) A portion of the sample injected was not volatile under these conditions. Peaks 3 and 4 exhibit ultraviolet absorption spectra characteristic of conjugated trienes (cf. K. Alder and H. von Brachel, Ann., 608, 195 (1957); H. H. Inhoffen, K. Bruckner, R. Grundel, and G. Quinkert, Ber. 87, 1407 (1954); H. H. Inhoffen and G. Quinkert, ibid., 87, 1418 (1954)). In the following group of examples catalytic amounts of the sensitizer are employed in conjunction with a hydrogen acceptor.

EXAMPLE 5

A solution of 7.55 g. of levopimaric acid, 0.125 g. of erythrosin, and 13.4 ml. (0.10 M) of nitromethane in 2485 ml. of 95% ethanol (0.01 M in resin acid, 0.00006 M in dye, and 0.10 M in nitromethane) was irradiated for 54.5 hrs. (final $[\alpha]_D +25°$) and worked up as in Example 2 except that the ether extraction was omitted. A quantitative yield of acidic residue was obtained; no absorption was exhibited in the 272 mu region. The residue was converted to the cyclohexylamine salt to give a yield of 7.7 g. (77%). Concentration of the mother liquor yielded a red oil. The salt was recrystallized to give 4.20 g. A dark red gummy solid was obtained on further concentration of the mother liquor. The acid was regenerated from the combined crops of salt as before and the crude acid purified, as in the preceding examples, by elution through a silicic acid column with benzene followed by crystallization from 95% ethanol. The yield of dehydroabietic acid was 1.02 g. of M.P. 168–170°; $[\alpha]_D +64°$ (c. 0.98 in 95% ethanol)

$$\lambda_{max.}^{alc.} \ 276 \ mu \ (\alpha \ 2.06)$$

the infrared spectrum was essentially identical to that of an authentic sample. A second crop of 0.28 g. of $[\alpha]_D^{28} +61.3°$ (c. 1.1 in 95% ethanol) was obtained for a total yield of 1.30 g. or 17% from levopimaric acid.

EXAMPLE 6

To a solution of 0.605 g. of levopimaric acid and 0.01 g. of erythrosin in 100 ml. of 95% ethanol was added 0.635 g. of sulfur flowers (0.02 M in resin acid, 0.0001 M in dye, and 0.20 M in sulfur). The dispersion was charged to the reactor described in Example 1, purged, and irradiated with a 15-watt fluorescent lamp until the specific rotation was constant ($[\alpha]_D -32°$) and the maximum at 272 mu was essentially gone (21 hrs.). A continuous flow of prepurified nitrogen was passed through the solution during irradiation and a heavy odor of hydrogen sulfied was present in the exit gas. The solution was filtered, the solvent stripped, the residual syrup converted to a cyclohexylamine salt (yield of 0.22 g.) and recrystallized from alcohol; $[\alpha]_D -7°$ (c. 0.30 in 95% ethanol). No characteristic absorption was observed from 220–320 mu $$\lambda_{max.}^{Nujol} \ 14.25 \ mu$$

and no bands were present in the 12.2 mu or 13.9 mu regions. The sodium fusion test for sulfur was positive. The salt exhibited a strong mercaptan odor. In the following example sulfur is used as the sensitizer and as the hydrogen acceptor.

EXAMPLE 7

A solution of 0.605 g. of levopimaric acid in 100 ml. of 95% ethanol containing 0.635 g. of dispersed sulfur flowers (0.02 M in resin acid, 0.20 M in sulfur) was charged to the reactor as described in Example 2, deaerated with prepurified nitrogen, stoppered, and irradiated with a 15-watt fluorescent lamp for a total of 91 hrs. at which time the specific rotation was constant at $+10°$ $$\lambda_{max.}^{alc.} \ 243 \ mu \ (\alpha \ 28)$$

A strong odor of hydrogen sulfide emanated from the reaction mixture during the irradiation. The solution was filtered free of sulfur and a cyclohexylamine salt prepared (yield 0.63 g.) and recrystallized from alcohol;

$$\lambda_{max.}^{Nujul} \ 6.68, \ 12.22, \ 13.9 \ mu$$

the sodium fusion test for sulfur was positive and the salt exhibited a strong odor of a mercaptan.

EXAMPLE 8

A solution of 1.20 g. of levopimaric acid, 10 mg. of erythrosin, and 1.26 g. of sulfur in a mixture of 99 ml. of carbon disulfide and 25 ml. of absolute ethanol was charged to the reactor described in Example 1, purged with prepurified nitrogen, stoppered, and irradiated with a 15-watt fluorescent lamp for 23 hours at which time the rotation became constant at $[\alpha]_D +22°$. No significant change in rotation was observed on further irradiation up to 60 hours. The solvent was stripped, the residue extracted with hot alcohol, and the alcohol stripped off to give a tan solid; $\lambda_{max}$ (Nujol mull) 6.68, 12.2, 14.2 mu (dehydroabietic acid).

EXAMPLE 9

The following compounds were found to function as sensitizers in the present work after the manner of erythrosin: 9,10-phenanthrenequinone, benzil, chloranil (in benzene solution), eosin, and 9,10-anthraquinone.

The following example was used as a control.

EXAMPLE 10

A measurement of specific rotation before and after an extended test period (6 to 44 hrs.) was used to determine if reaction had occurred. For all of the reactions described above, suitable controls were run. These controls showed that no reaction occurred in the absence of irradiation, in the absence of sensitizing dye (with the exception of sulfur), in the absence of resin acids or in the absence of nitromethane or sulfur (other than a rapid bleaching of the small amount of dye used as a sensitizer in the latter two cases).

EXAMPLE 11

A solution of 0.605 g. of levopimaric acid, 0.01 g. of erythrosin, and 1.26 g. of benzil in 100 ml. of 95% ethyl alcohol (0.02 in resin acid; 0.06 M in benzil and 100 mg./l. in dye) was charged to the reaction described in Example 1, purged with prepurified nitrogen, stoppered, and irradiated with a 15-watt fluorescent lamp for 58.5 hrs. The specific rotation of the solution remained constant over the last 25 hours of irradiation at $+31.5°$. Concentration of the reaction mixture to 2.5 ml. gave 0.34 g. of unreacted benzil by crystallization. Further concentration and the addition of a little water gave 0.27 g. of a crystalline product which exhibited an infrared spectrum essentially identical to that of benzoin with the exception of a very strong absorption band at 2.93 mu (hydroxyl stretching band). A carbonyl doublet was noted at 5.97 and 6.02 mu. The M.P. was 114–122° C. (M.P. $C_6H_5COCHOHC_6H_5$ 133–137°;

$$C_6H_5CHOHCHOHC_6H_5 \ 134°;$$

$C_6H_5COCOC_6H_5$ 95°). Thus the product is either impure benzoin or a mixture of hydrobenzoin plus some benzil. The mother liquor was diluted with acetone, a slight excess of cyclohexylamine added, the salt collected (0.24 g.) and dried. Its infrared spectrum [$\lambda_{max}$ (Nujol mull) 6.18, 12.22, 13.9 mu] identified it as the salt of dehydroabietic acid.

EXAMPLE 12

A solution of 1.20 g. of levopimaric acid and 2.57 g. of benzil in 100 ml. of 95% ethanol (0.04 M in resin acid and 0.12 M in benzil) was charged to the apparatus described in Example 1, purged with prepurified nitrogen, stoppered, and irradiated for 6.0 hours with a 15-watt fluorescent lamp. The specific rotation of the solution changed from $-272°$ to $-199°$ as a result of the irradiation. In the absence of light, a duplicate solution did not exhibit any change in specific rotation on standing 6.0 hours in the dark. The reaction was repeated in benzene solution and after 31 hours of irradiation the solution exhibited $[\alpha]_D +14.5°$. These changes in rotation are due to the formation of dehydroabietic acid.

EXAMPLE 13

A solution of 1.20 g. of levopimaric acid and 0.99 g. of chloranil in 100 ml. of benzene (0.04 M in resin acid and 0.04 M in chloranil) was charged to the apparatus described in Example 1, purged with prepurified nitrogen, stoppered, and irridiated with a 15-watt fluorescent lamp for 23 hours; final $[\alpha]_D +31°$. A crystalline product formed on standing and was filtered off; weight 0.21 g.

It exhibited no carbonyl bands in the infrared absorption spectrum with peaks at 2.98, 6.83, 7.12, 11.33, 13.9–14.25 mu thus establishing the material as tetrachlorohydroquinone. The filtrate was stripped to dryness, dissolved in a little acetone, and an excess of cyclohexylamine added. The salt was collected and dried. Its infrared spectrum [$\lambda_{max}$ (Nujol mull) with peaks at 6.62, 12.2, 13.9 mu] indicated the material to be the salt of dehydroabietic acid.

EXAMPLE 14

A solution of 1.20 g. of levopimaric acid and 0.21 g. of 9,10-phenanthrenequinone in 100 ml. of 95% ethanol (0.04 M in resin acid and 0.01 M in quinone) was charged to the reactor as described in Example 1, purged with prepurified nitrogen, stoppered, and irradiated with a 15-watt fluorescent lamp for 6 hours during which time the specific rotation of the solution fell from −280° to −215° due to the formation of dehydroabietic acid.

EXAMPLE 15

A solution of 1.20 g. of levopimaric acid and 0.21 g. of 9,10 anthraquinone in 100 ml. of 95% ethanol (0.04 M in resin acid and 0.01 M in quinone) was charged to the reactor described in Example 1. The solution was then purged with prepurified nitrogen, stoppered, and irradiated for 6.0 hours, during which time the specific rotation of the solution fell from −276° to −216° due to the formation of dehydroabietic acid.

We claim:
1. A process for the photodehydrogenation of gum resin acids which comprises:
   (a) dissolving a gum resin acid in at least one solvent selected from the group consisting of 90% ethanol, methanol, benzene, alcohol-aqueous alkali, aqueous alkali, and carbon disulfide-alcohol,
   (b) incorporating into the resin acid solution about 0.003 to 0.03 mole, per mole of resin acid, of an oxidation-type sensitizer selected from the group consisting of erythrosin, eosin, 9,10-phenanthrenequinone, and 9,10-anthraquinone, and about 1 to 10 moles per mole of resin acid of a hydrogen acceptor selector from the group consisting of nitromethane, benzil and sulfur,
   (c) irradiating the solution of resin acid, oxidation-type sensitizer, and hydrogen acceptor with visible light in an oxygen-free atmosphere to dehydrogenate the resin acid,
   (d) continuing the irradiation of the solution until the optical activity, [$\alpha$]$_D$ reaches a constant value, and
   (e) thereafter recovering the dehydrogenated product.
2. The process of claim 1 wherein the hydrogen acceptor is sulfur.
3. The process of claim 1 wherein the hydrogen acceptor is benzil.
4. The process of claim 1 wherein the hydrogen acceptor is chloranil.

5. A process for the photodehydrogenation of gum resin acids which comprises:
   (a) dissolving a gum resin acid in at least one solvent selected from the group consisting of 95% ethanol, methanol, benzene, alcohol-aqueous alkali, aqueous alkali, and carbon disulfide-alcohol,
   (b) incorporating about an equimolar amount of sulfur, based on the resin acids, into the resin acid solution,
   (c) irradiating the sulfur-containing solution of resin acid with visible light in an oxygen-free atmosphere, and
   (d) continuing the irradiation of the solution until the optical activity [$\alpha$]$_D$ reaches a constant value.
6. A process for the photodehydrogenation of gum resin acids which comprises:
   (a) dissolving the gum resin acid in at least one solvent selected from the group consisting of 95% ethanol, methanol, benzene, alcohol-aqueous alkali, aqueous alkali, and carbon disulfide-alcohol;
   (b) incorporating into the resin acid solution from about a 1:2 to 2:1 molar ratio, based on the amount of resin acid, of an oxidation-type sensitizer from the group consisting of erythrosin, 9,10-phenanthrenequinone, chloranil, eosin, and 9,10-anthraquinone;
   (c) irradiating the sensitized resin acid solution in an oxygen-free atmophere with visible light to dehydrogenate the resin acid;
   (d) continuing the irradiation of the sensitized resin acid solution until the optical activity [$\alpha$]$_D$ reaches a constant value; and
   (e) thereafter recovering the thus dehydrogenated product.
7. The process of claim 6 wherein the resin acid is neoabietic acid, the sensitizer is present in an equimolar amount with respect to said acid, and the dehydrogenated product is a conjugated triene.
8. The product obtained by the process of claim 7.

References Cited by the Examiner

UNITED STATES PATENTS

| | | | |
|---|---|---|---|
| 2,201,237 | 5/1940 | Littmann | 260—514.5 |
| 2,240,936 | 5/1941 | Littmann | 260—102 |
| 2,367,002 | 1/1945 | Campbell | 260—514.5 |
| 2,395,278 | 2/1946 | Kalman | 260—103 |
| 2,899,463 | 8/1959 | Moore | 204—158 |
| 2,996,515 | 8/1961 | Moore | 260—99 |
| 3,086,989 | 4/1963 | Schuller | 204—158 |

OTHER REFERENCES

R. N. Moore and R. V. Lawrence, Journal of the American Chemical Society, vol. 80, pp. 1438–1440 (1958).

LEON J. BERCOVITZ, *Primary Examiner.*

F. McKELVEY, *Assistant Examiner.*